United States Patent
Lin et al.

(10) Patent No.: US 8,616,852 B2
(45) Date of Patent: Dec. 31, 2013

(54) WELDING REPAIR METHOD OF AN INTEGRALLY BLADED ROTOR

(75) Inventors: Wangen Lin, South Glastonbury, CT (US); Robert W. Jackson, Simsbury, CT (US); Andrew L. Haynes, Glastonbury, CT (US); John E. Matz, Natick, MA (US); Adam Quagliaroli, Windsor Locks, CT (US); Samuel T. Davidson, Suffield, CT (US); Herbert A. Chin, Portland, CT (US)

(73) Assignee: United Technologies Corporation, Hartford, CT (US)

( * ) Notice: Subject to any disclaimer, the term of this patent is extended or adjusted under 35 U.S.C. 154(b) by 1071 days.

(21) Appl. No.: 12/625,654

(22) Filed: Nov. 25, 2009

(65) Prior Publication Data

US 2011/0123347 A1 May 26, 2011

(51) Int. Cl.
*F04D 29/38* (2006.01)

(52) U.S. Cl.
USPC ..................................... 416/229 R; 29/889.7

(58) Field of Classification Search
USPC ...... 416/224, 229 R, 241 R; 29/889.1, 889.7, 29/402.1, 889.71
See application file for complete search history.

(56) References Cited

U.S. PATENT DOCUMENTS

| | | | |
|---|---|---|---|
| 4,883,216 A * | 11/1989 | Patsfall | ........................ 228/119 |
| 5,111,570 A | 5/1992 | Baumgarten et al. | |
| 5,113,583 A | 5/1992 | Jenkel et al. | |
| 5,479,704 A | 1/1996 | Richter et al. | |
| 5,913,555 A | 6/1999 | Richter et al. | |
| 6,543,134 B2 | 4/2003 | Meier | |
| 6,705,011 B1 | 3/2004 | Leibfried et al. | |
| 7,034,262 B2 | 4/2006 | Fischer et al. | |
| 7,244,320 B2 | 7/2007 | Malley et al. | |
| 7,509,734 B2 | 3/2009 | Memmen et al. | |
| 7,568,609 B2 | 8/2009 | Shimohata et al. | |
| 7,600,977 B2 | 10/2009 | Shadbolt et al. | |
| 2005/0091848 A1 | 5/2005 | Nenov et al. | |

FOREIGN PATENT DOCUMENTS

JP 61-147970 7/1986

OTHER PUBLICATIONS

Deutscher Verband für Schweisstechnik e.V. 53, "Welding in the Aerospace Industry—Design, Materials, Welding Methods, Maintenance: Situation of Welding in Engine Maintenance," pp. 72-79.
Search Report and Written Opinion for Singapore Application No. 201008103-2, Jun. 6, 2012.

* cited by examiner

*Primary Examiner* — Dwayne J White
(74) *Attorney, Agent, or Firm* — Carlson, Gaskey & Olds, P.C.

(57) ABSTRACT

A method of repairing a rotor blade, for example on an integrally bladed rotor, includes preparing a surface on a damaged area of the blade. The blade has first and second airfoil surfaces adjoining the prepared surface that are spaced apart a distance. An edge of a patch abuts the prepared surface to provide a weld interface defining a welding plane. First and second cover sheets respectively overlap the first and second airfoil surfaces. The first and second cover sheets adjoin the edge and the first and second airfoil surfaces. The blade, patch and first and second cover sheets are welded along the welding plane providing a welded joint at the weld interface. The first and second cover sheets are substantially unsecured to the first and second airfoil surfaces subsequent to the welding operation.

18 Claims, 3 Drawing Sheets

WELDING REPAIR METHOD OF AN INTEGRALLY BLADED ROTOR

STATEMENT REGARDING FEDERALLY SPONSORED RESEARCH OR DEVELOPMENT

The government may have certain rights to this invention pursuant to Contract No. F33657-99-D-2051 awarded by the United States Air Force.

BACKGROUND

This disclosure relates to a welding repair method of a rotor blade, for example, on an integrally bladed rotor. A welding fixture is also disclosed for use in producing a welded blade according to the disclosed repair method.

Integrally bladed rotors include a rotor hub with multiple circumferentially spaced blades extending radially outwardly from a periphery of the rotor hub. Integrally bladed rotors are often constructed from titanium. Unlike removably secured rotor blades, if a rotor blade of an integrally bladed rotor becomes damaged, the entire rotor assembly must be replaced. Currently, there is no repeatable method of repairing a damaged rotor blade using beam welding.

SUMMARY

A method of repairing a rotor blade includes preparing a surface on a damaged area of the blade. The blade has first and second airfoil surfaces adjoining the prepared surface that are spaced apart a distance. An edge of a patch abuts the prepared surface to provide a weld interface defining a welding plane. First and second cover sheets respectively overlap the first and second airfoil surfaces. The first and second cover sheets adjoin the edge and the first and second airfoil surfaces. The blade, patch and first and second cover sheets are welded along the welding plane providing a welded joint at the weld interface. The first and second cover sheets are substantially unsecured to the first and second airfoil surfaces subsequent to the welding operation in the example.

A weld clamping device is used during the welding operation. The weld clamping device includes first and second portions configured to be arranged about first and second parts, for example, the patch and the blade. A first slot is arranged in the first portion and is configured to expose the weld interface between the first and second parts. A first clamping feature is configured to secure the first and second portions about the first and second parts. A locating feature is provided on at least one of the first and second portions and is configured to maintain a first and second parts in abutment relative to one another at the weld interface. Other clamping features are used to locate the first and second cover sheets relative to the path and/or blade.

BRIEF DESCRIPTION OF THE DRAWINGS

The disclosure can be further understood by reference to the following detailed description when considered in connection with the accompanying drawings wherein.

DETAILED DESCRIPTION

Figure 1:
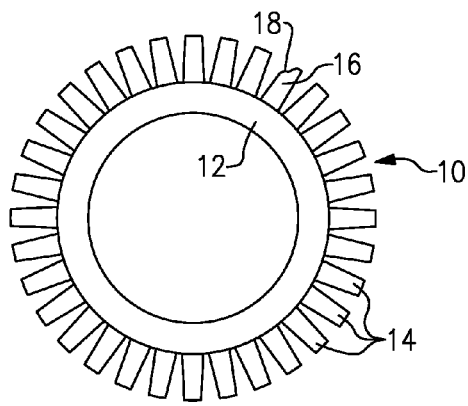
FIG. 1 is a schematic view of an integrally bladed rotor.

An integrally bladed rotor 10 is schematically shown in FIG. 1. The integrally bladed rotor 10 includes a rotor hub 12 from which circumferentially spaced blades 14 extend. An integrally bladed rotor 10 that has been in service may include one or more damaged blades 16 having a damaged area 18 caused by debris ingested into a gas turbine engine within which the integrally bladed rotor is arranged.

The damaged blade 16 is machined to provide a prepared surface 20. The prepared surface 20 may be a flat surface that is generally perpendicular to the spaced apart airfoil surfaces 30. The prepared surface 20 may also be arranged at an angle relative to the airfoil surfaces 30, if desired.

In one example, the integrally bladed rotor 10 is constructed from titanium or a titanium alloy. Other materials may be used, such as nickel or nickel alloys. A beam welding process, such as electron beam or laser beam, is used to weld the titanium. These beam welding processes do not utilize a filler material as do TIG and MIG welding processes. Beam welding can produce undercuts in the weld area creating areas of the weld void of material where material is desired.

Figure 2:
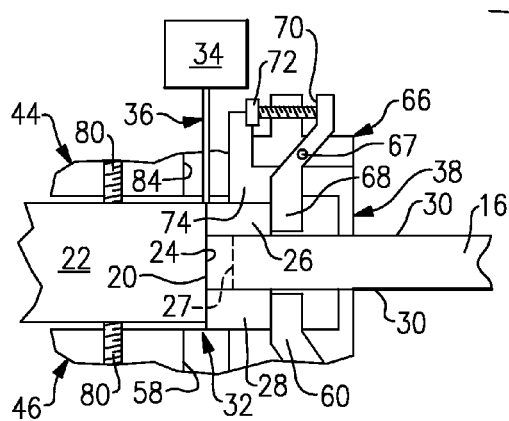
FIG. 2 is a schematic, cross-sectional view of a weld clamping device affixing a patch and first and second cover sheets relative to a rotor blade.
Figure 4:
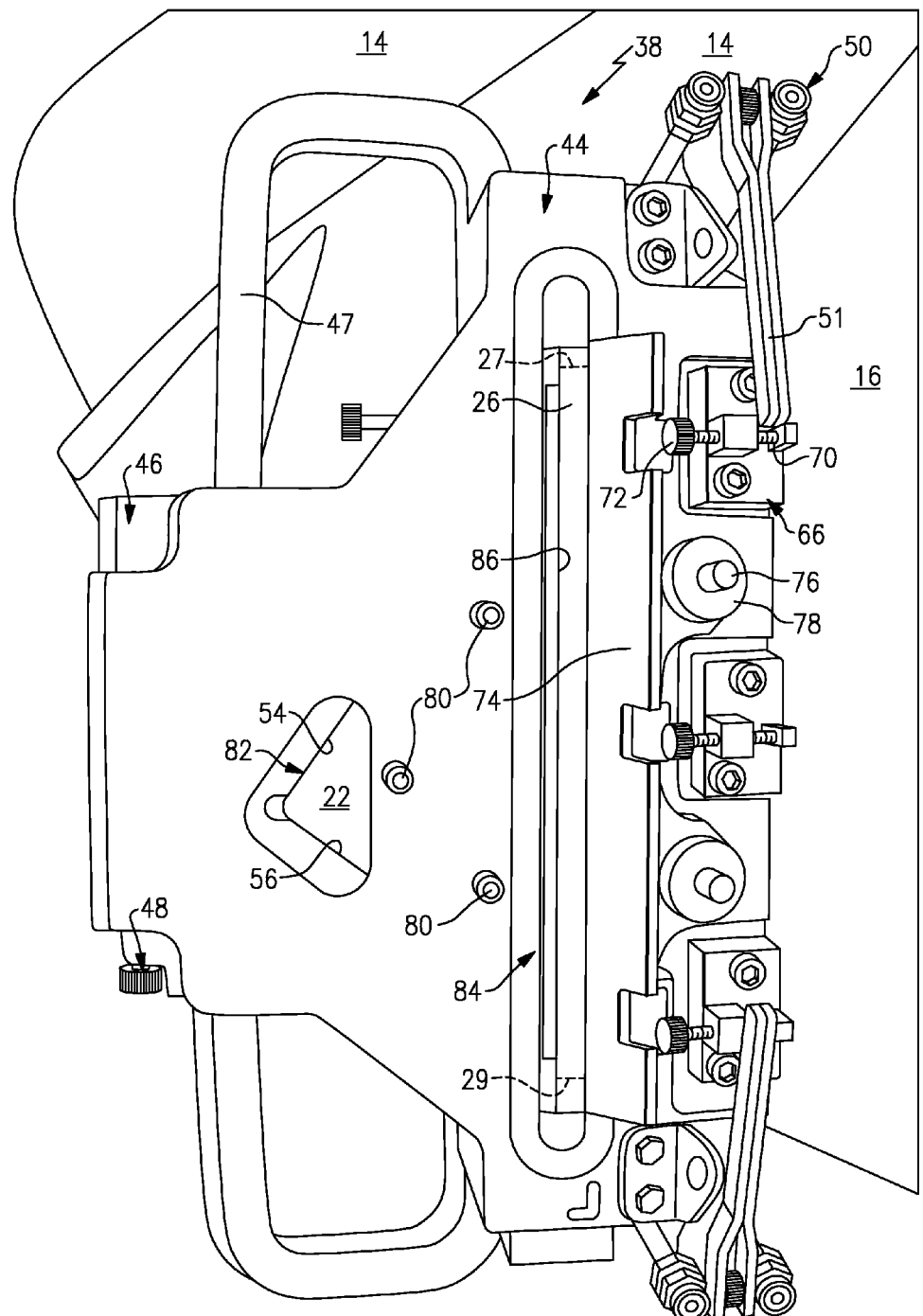
FIG. 4 is an elevational view of the weld clamping device in a closed position secured about the patch, the first and second cover sheets and the rotor blade.

A patch 22 including an edge 24 is arranged in abutment or engagement with the prepared surface 20. The terms "abutment," "engagement" and "adjoining" mean "in contact with" and/or "in very close proximity to," for example, less than the width of a weld beam 36. First and second cover sheets 26, 28 are arranged on opposite airfoil surfaces 30 in abutment with the edge 24 and the airfoil surfaces 30. Other sheets 27, 29 can also be used in proximity to the edge 24, as illustrated in FIGS. 2 and 4. In the example shown in FIG. 2, the edge 24 has a thickness greater than a distance between the airfoil surfaces 30. In this manner, the patch 22, first and second cover sheets 26, 28 and prepared surface 20 provide a weld interface defining a welding plane 32.

A weld clamping device 38 maintains the patch 22, first and second cover sheets 26, 28 and damaged blade 16 in a desired orientation with those parts in engagement with one another. A welding device 34, such as an electron beam welder, provides a weld beam 36 in the welding plane 32 to provide the welded blade illustrated in FIG. 5. The welded blade includes a welded joint 41 at which the first and second cover sheets 26, 28 and prepared surface 20 are fused to the edge 24. The first and second cover sheets 26, 28, however, are substantially unsecured relative to the airfoil surfaces 30, as illustrated in FIG. 5.

Figure 6:
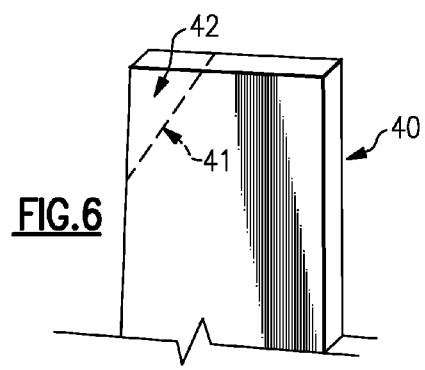
FIG. 6 is a schematic view of a repaired blade.
Figure 5:
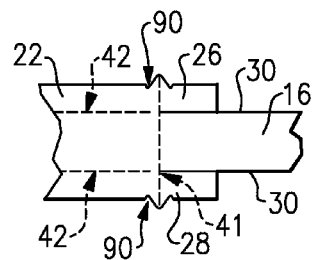
FIG. 5 is a schematic, cross-sectional view of a welded blade subsequent to the welding operation.

With continuing reference to FIG. 5, undercuts 90 produced during the welding process are arranged outwardly from the airfoil surfaces 30. The airfoil surfaces 30 are restored to the damaged blade 16 and extended to the patch 22 by machining away the first and second cover sheets 26, 28 and the patch 22 to provide a repaired blade 40 with machined surfaces 42, as illustrated in FIG. 6.

Figure 3:
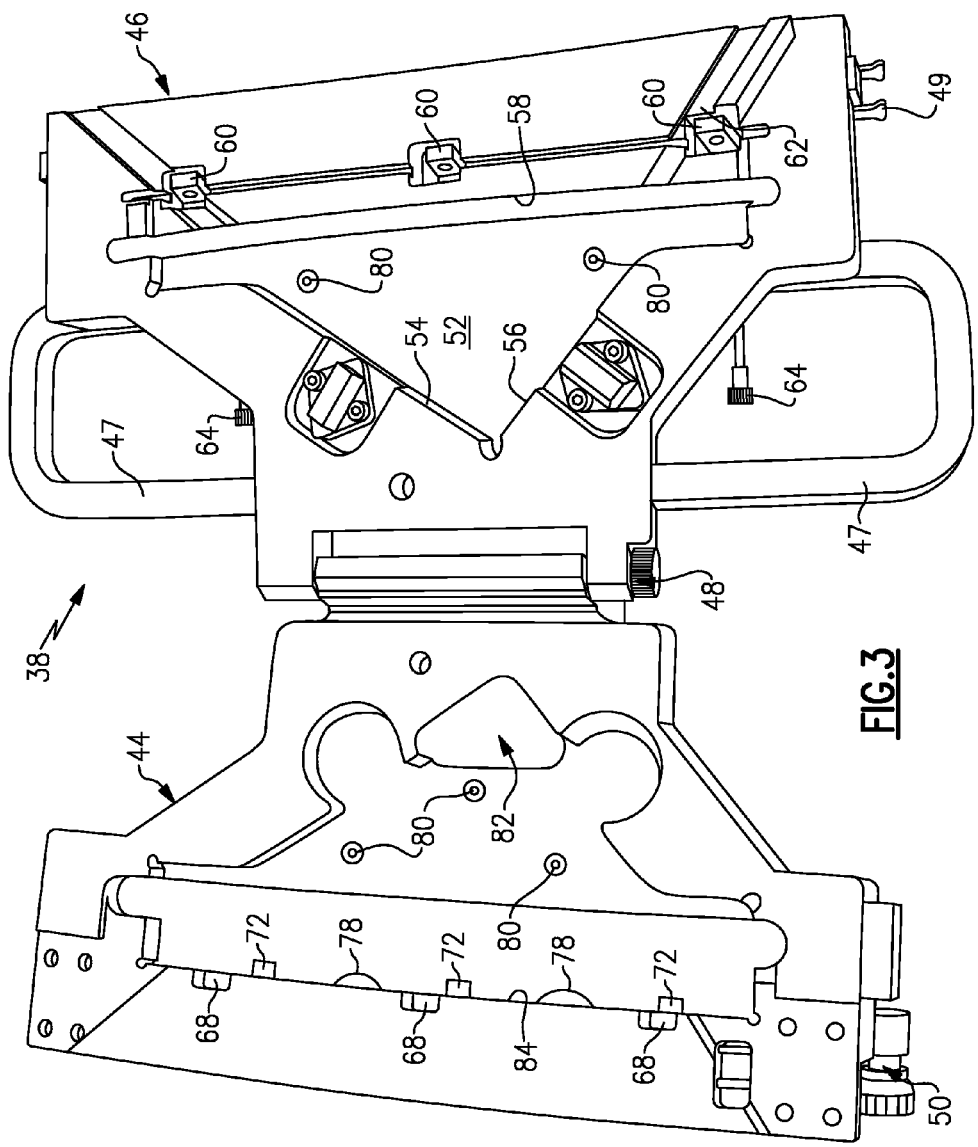
FIG. 3 is an elevational view of the weld clamping device in an open position.

Referring to FIGS. 2-4, an example weld clamping device 38 is shown in more detail and provide multiple clamping features to maintain the parts in desired orientation relative to one another. The weld clamping device 38 includes first and second portions 44, 46 pivotably secured relative to one another at a hinge joint 48. The first and second portions 44, 46 are retained in a closed position (FIG. 4) with a first clamping feature including clamps 50 that cooperate with latches 49. The clamps 50 each include a handle 51 that is rotated to the position shown in FIG. 4 to secure the clamps 50.

A pocket 52 is provided in the first and second portions 44, 46 for receiving and locating the patch 22. The pocket 52 includes first and second walls 54, 56 providing a locating feature that locates a corner of the patch 22, which is visible through a window 82 in the first portion 44 with the weld clamping device 38 in the closed position (FIG. 4). The second portion 46 includes a lower slot 58 aligned with the welding plane 32. Multiple movable pads 60 provide a second clamping feature and are arranged near the lower slot 58 for clamping the second cover sheet 28 into engagement with the edge 24 of the patch 22, as illustrated in FIG. 2. The pads 60 are moved toward the second cover sheet 28 by rotating an adjustment screw 64 associated with each of the pads 60. The adjustment screw 64 acts against a face 62 of the second portion 46. In a similar arrangement, the first portion 44 includes movable pads 68 providing a third feature and that hold the first cover sheet 26 into engagement with the edge 24 of the patch 22. Supports 66, best shown in FIGS. 2 and 3, support the pads 68 and provide a face 70. An adjustment screw 72 is associated with each of the pads and acts against the face 70 to pivot the pad 68 about point 67 and apply force to the first cover sheet 26.

A clamping bar 74, providing a fourth clamping feature, is arranged in an upper slot 84 of the first portion 44. The upper slot 84 also accommodates the weld beam 36. The clamping bar 74 is arranged over the first cover sheet 26. Screws 76 extending from the first portion 44 receive adjustment nuts 78 that, when turned, force the clamping bar 74 downward into engagement with the first cover sheet 26 maintaining the first and second cover sheets 26, 28 into tight engagement with the airfoil surfaces 30.

Set screws 80 are provided in each of the first and second portions 44, 46 in the example to provide a fifth clamping feature. The set screws 80 are rotatable into the pocket 52 and into engagement with the patch 22 to position the patch 22 in a desired orientation relative to the damaged blade 16.

Figure 7:
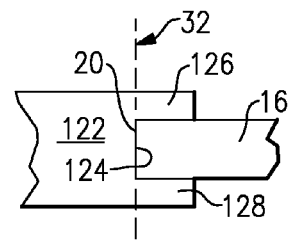
FIG. 7 is a schematic, cross-sectional view of another example patch and cover sheet arrangement.

An alternative patch 122 is illustrated in FIG. 7. The patch 122 includes a machined recess providing the edge 124. The first and second cover sheets 126, 128 are integrally provided with the patch 122. The welding plane 132 is provided along the edge 124, which abuts the prepared surface 20.

Although example embodiments have been disclosed, a worker of ordinary skill in this art would recognize that certain modifications would come within the scope of the claims. For example, more or fewer clamping features than disclosed may be used. Also, each clamping feature may only employ a single clamping member rather than multiple clamping members (e.g. the clamps 50, the pads 60, 68 and the set screws 80). For that reason, the following claims should be studied to determine their true scope and content.

What is claimed is:

1. A method of repairing a rotor blade comprising:
   preparing a surface on a damaged area of a blade, the blade having first and second airfoil surfaces adjoining the prepared surface that are spaced apart a distance, the first and second airfoil surfaces extending to the prepared surface in a direction;
   abutting an edge of a patch to the prepared surface to provide a weld interface defining a welding plane;
   overlapping first and second cover sheets respectively over the first and second airfoil surfaces, the first and second cover sheets adjoining the edge and the first and second airfoil surfaces with the first and second cover sheets extending beyond the prepared surface and the welding plane in the direction; and
   welding the blade, patch and first and second cover sheets along the welding plane providing a welded joint at the weld interface.

2. The method according to claim 1, wherein the edge has a thickness greater than the distance.

3. The method according to claim 1, wherein the first and second cover sheets are substantially unsecured to the airfoil surfaces subsequent to the welding step.

4. The method according to claim 1, comprising machining the patch and the first and second cover sheets to extend the first and second airfoil surfaces to the patch and provide a repaired blade.

5. The method according to claim 1, wherein the blade, the patch and the first and second cover sheets include titanium.

6. The method according to claim 1, comprising clamping the blade with a first clamping feature.

7. The method according to claim 6, comprising clamping the first cover sheet against the patch with a second clamping feature.

8. The method according to claim 7, comprising clamping the second cover sheet against the patch with a third clamping feature.

9. The method according to claim 8, comprising clamping the first and second cover sheets respectively to the first and second airfoil surfaces with a fourth clamping feature.

10. The method according to claim 9, comprising clamping the patch in a desired position with a fifth clamping feature.

11. A welded blade comprising:
    a blade having first and second airfoil surfaces;
    a patch secured to the blade at a welded joint adjoining the first and second airfoil surfaces, and the blade extending in a direction to the welded joint; and
    first and second cover sheets secured to the patch over the welded joint and extending beyond the welded joint in the direction, and respectively extending over the first and second airfoil surfaces in the direction in overlapping relationship thereto, the first and second cover sheets substantially unsecured to the first and second airfoil surfaces.

12. The welded blade according to claim 11, comprising a hub, the blade integral with the hub.

13. The welded blade according to claim 12, wherein the hub and the blade comprise titanium.

14. A weld clamping device comprising:
    first and second portions configured to be arranged about first and second parts, a first slot in the first portion configured to expose a weld interface between the first and second parts;
    a first clamping feature configured to secure the first and second portions about the first and second parts; and
    a locating feature provided on at least one of the first and second portions configured to maintain the first and second parts in abutment relative to one another at the weld interface.

15. The weld clamping device according to claim 14, including a second clamping feature including a movable pad configured to be engageable with a first cover sheet, the first cover sheet configured to abut the first and second parts.

16. The weld clamping device according to claim 15, including a third clamping feature including a movable pad configured to be engageable with a second cover sheet, the second cover sheet configured to abut the first and second parts.

17. The weld clamping device according to claim 16, including a fourth clamping feature configured to retain first and second cover sheets about one of the first and second parts at the weld interface.

18. The weld clamping device according to claim 17, including a fifth clamping feature configured to position one of the first and second parts in a desired orientation relative to the other of the first and second parts.

* * * * *